United States Patent
Ooe et al.

(10) Patent No.: US 12,420,785 B2
(45) Date of Patent: Sep. 23, 2025

(54) COLLISION DAMAGE REDUCTION APPARATUS

(71) Applicant: TOYOTA JIDOSHA KABUSHIKI KAISHA, Aichi-ken (JP)

(72) Inventors: Kento Ooe, Toyota (JP); Kan Mayoshi, Nagoya (JP); Atsushi Kobayashi, Tokyo (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 162 days.

(21) Appl. No.: 18/469,503

(22) Filed: Sep. 18, 2023

(65) Prior Publication Data
US 2024/0149872 A1 May 9, 2024

(30) Foreign Application Priority Data
Nov. 4, 2022 (JP) .................................. 2022-177112

(51) Int. Cl.
*B60W 30/095* (2012.01)
*B62D 15/02* (2006.01)

(52) U.S. Cl.
CPC ..... *B60W 30/0956* (2013.01); *B62D 15/0265* (2013.01); *B60W 2554/4042* (2020.02)

(58) Field of Classification Search
CPC ............... B60W 30/09; B60W 30/095; B60W 30/0953; B60W 30/0956
See application file for complete search history.

(56) References Cited

U.S. PATENT DOCUMENTS

| | | | |
|---|---|---|---|
| 9,969,261 B2 | 5/2018 | Kodama | |
| 10,045,173 B1 | 8/2018 | Morimura et al. | |
| 10,106,157 B2 | 10/2018 | Sawada et al. | |
| 10,150,407 B2 | 12/2018 | Takahashi et al. | |
| 10,661,793 B2* | 5/2020 | Minemura | B60W 40/00 |
| 10,696,297 B2 | 6/2020 | Nguyen Van et al. | |
| 11,001,255 B2 | 5/2021 | Fukuman et al. | |
| 11,110,937 B2 | 9/2021 | Kinoshita et al. | |
| 11,603,116 B2* | 3/2023 | Boydston | B60W 30/18154 |
| 2015/0291159 A1 | 10/2015 | Sasabuchi | |
| 2019/0001968 A1 | 1/2019 | Yorifuji et al. | |
| 2019/0001973 A1* | 1/2019 | Matsunaga | B60W 30/095 |
| 2019/0103017 A1* | 4/2019 | Ohta | B60Q 1/04 |
| 2019/0122555 A1* | 4/2019 | Takaki | G01S 13/931 |
| 2019/0263344 A1* | 8/2019 | Yokoi | B60W 30/095 |
| 2019/0344828 A1 | 11/2019 | Omori et al. | |

(Continued)

FOREIGN PATENT DOCUMENTS

JP 2015-203983 A 11/2015

*Primary Examiner* — Anshul Sood
(74) *Attorney, Agent, or Firm* — HAUPTMAN HAM, LLP

(57) ABSTRACT

A collision damage reduction apparatus executes a collision damage reduction control to reduce damage due to a collision of an own vehicle with an object. The apparatus executes the collision damage reduction control when the object exists in a first area. The first area is an area in a moving direction of the own vehicle and has a first width set, based on a width of the own vehicle. The apparatus executes the collision damage reduction control when the object does not exist in the first area, but the object predictively exists in a second area after a predetermined period of time. The second area is an area in the moving direction of the own vehicle and has a width smaller than the first width.

2 Claims, 5 Drawing Sheets

(56) References Cited

U.S. PATENT DOCUMENTS

| | | |
|---|---|---|
| 2019/0389488 A1 | 12/2019 | Yamada et al. |
| 2021/0261159 A1* | 8/2021 | Pazhayampallil .... B60W 10/18 |
| 2021/0287548 A1* | 9/2021 | Lai .......................... B60R 1/025 |

* cited by examiner

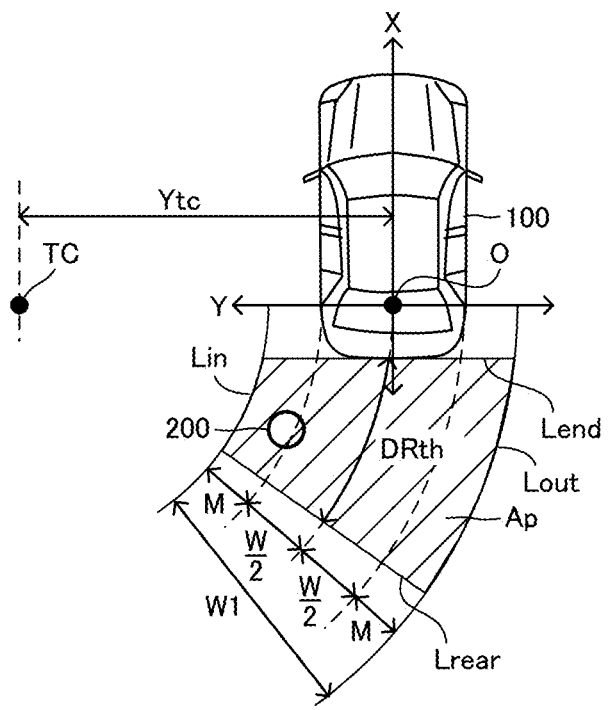 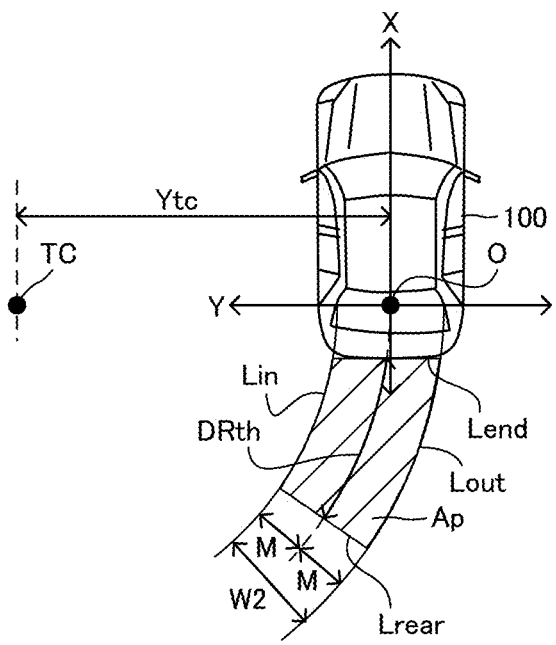
FIG.5A　　　　　　　　FIG.5B
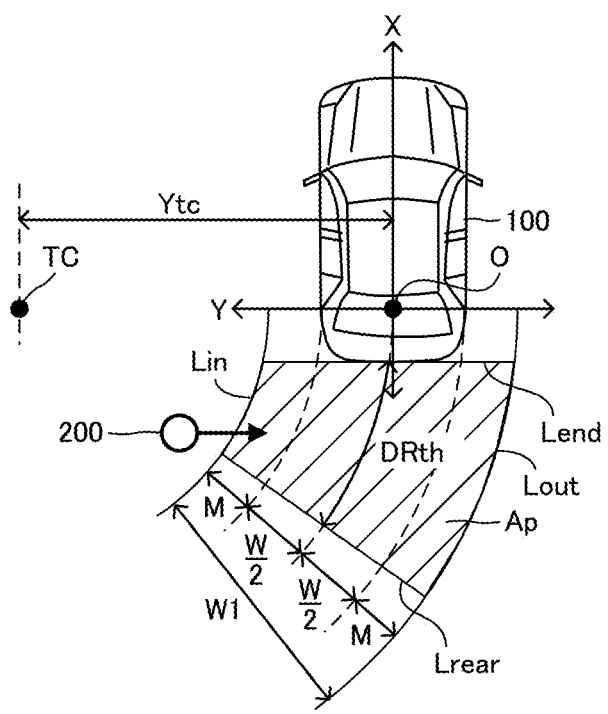 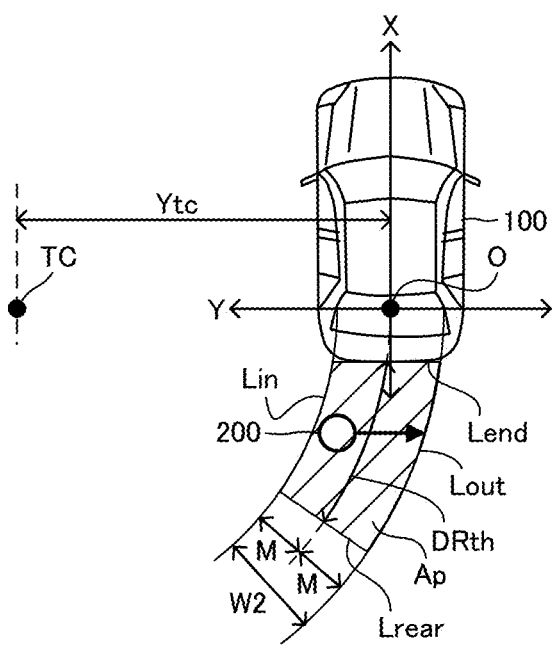
FIG.5C　　　　　　　　FIG.5D

COLLISION DAMAGE REDUCTION APPARATUS

CROSS-REFERENCE TO RELATED APPLICATIONS

This application claims priority to Japanese patent application No. JP 2022-177112 filed on Nov. 4, 2022, the content of which is hereby incorporated by reference in its entirety.

BACKGROUND

Field

The present invention relates to a collision damage reduction apparatus.

Description of the Related Art

There is known a collision damage reduction apparatus which executes a collision damage reduction control to reduce damage due to a collision of a vehicle with an object. As this type of the collision damage reduction apparatus, there is also known a collision damage reduction apparatus which determines whether the vehicle collides with the object, based on whether the object exists in a predetermined area in a moving direction of the vehicle, or whether the object exists in the predetermined area after a predetermined period of time, and executes the collision damage reduction control when determining that the vehicle collides with the object (for example, refer to JP 2015-203983 A).

The known collision damage reduction apparatus determines whether the object exists in the predetermined area after the predetermined period of time, for example, by using a moving speed of the object detected, based on camera images. In this regard, when a detection accuracy of detecting the moving speed of the object, based on the camera images, may be low, a determination accuracy of determining whether the object exists in the predetermined area after the predetermined period of time, that is, a determination accuracy of a probability that the vehicle collides with the object after the predetermined period of time, may be low. In this case, the collision damage reduction control may be unnecessarily executed. That is, the collision damage reduction control may be unnecessarily executed due to determining whether to execute the collision damage reduction control, based on a predicted future position of the object.

SUMMARY

An object of the present invention is to provide a collision damage reduction apparatus which can prevent the collision damage reduction control from being unnecessarily executed by determining whether to execute the collision damage reduction control, based on the predicted future position of the object.

A collision damage reduction apparatus according to the present invention comprises an electronic control unit. The electronic control unit is configured to execute a collision damage reduction control to reduce damage due to a collision of an own vehicle with an object. The electronic control unit is further configured to execute the collision damage reduction control when the object exists in a first area. The first area is an area in a moving direction of the own vehicle and has a first width set, based on a width of the own vehicle. The electronic control unit is further configured to execute the collision damage reduction control when the object does not exist in the first area, but the object predictively exists in a second area after a predetermined period of time. The second area is an area in the moving direction of the own vehicle and has a width smaller than the first width.

If the first area of the present invention used for determining whether to execute the collision damage reduction control, based on the present position of the object, is used for determining whether to execute the collision damage reduction control, based on a prediction result of predicting a future position of the object, the collision damage reduction control may be executed unnecessarily due to a low accuracy of the prediction result.

With the collision damage reduction apparatus according to the present invention, the second area narrower than the first area used for determining whether to execute the collision damage reduction control, based on the present position of the object, is used for determining whether to execute the collision damage reduction control, based on the prediction result of predicting the future position of the object. Thus, the collision damage reduction control can be prevented from being unnecessarily executed.

In the collision damage reduction apparatus according to an aspect of the present invention, the electronic control unit may be configured to predict whether the object exists in the second area after the predetermined period of time, based on a moving distance which the object predictively moves for the predetermined period of time. In this aspect, the electronic control unit may be further configured to predict whether the object exists in the second area after the predetermined period of time, limiting the moving distance to a distance equal to or smaller than an upper limit distance when the moving distance is greater than the upper limit distance.

When a distance which the object predictively moves for a certain period of time, is excessively great, a prediction result of predicting the distance may be wrong. In this case, the collision damage reduction control may be unnecessarily executed.

With the collision damage reduction apparatus according to this aspect of the present invention, when the moving distance which the object predictively moves for the predetermined period of time, is greater than the upper limit distance, the moving distance is limited to a distance equal to or smaller than the upper limit distance, and whether the collision damage reduction control should be executed, is determined, based on the limited moving distance. Thus, the collision damage reduction control can be prevented from being unnecessarily executed.

In the collision damage reduction apparatus according to another aspect of the present invention, the electronic control unit may be configured to not execute the collision damage reduction control, independently of whether the object exists in the second area after the predetermined period of time when (i) a detected moving speed of the object is greater than a predetermined speed, and (ii) the object does not exist in the first area.

When the detected moving speed of the object is excessively great, a detection result of detecting the moving speed of the object may be wrong. In this case, the collision damage reduction control may be executed unnecessarily.

With the collision damage reduction apparatus according to this aspect of the present invention, when (i) the detected moving speed of the object is greater than the predetermined speed, and (ii) the object does not exist in the first area, the collision damage reduction control is not executed, independently of whether the object exists in the second area after the predetermined period of time. Thus, the collision damage reduction control can be prevented from being unnecessarily executed.

Elements of the invention are not limited to elements of embodiments and modified examples of the invention described with reference to the drawings. The other objects, features and accompanied advantages of the invention can be easily understood from the embodiments and the modified examples of the invention.

BRIEF DESCRIPTION OF THE DRAWINGS

FIG. 5A is a view which shows the present object position determination area when the own vehicle turns rearward.

FIG. 5B is a view which shows the future object position determination area when the own vehicle turns rearward.

FIG. 5C is a view which shows a scene that the object does not exist in the present position determination area when the own vehicle turns rearward.

FIG. 5D is a view which shows a scene that the object exists in the future position determination area when the own vehicle turns rearward.

DESCRIPTION OF THE EMBODIMENTS

Figure 1:
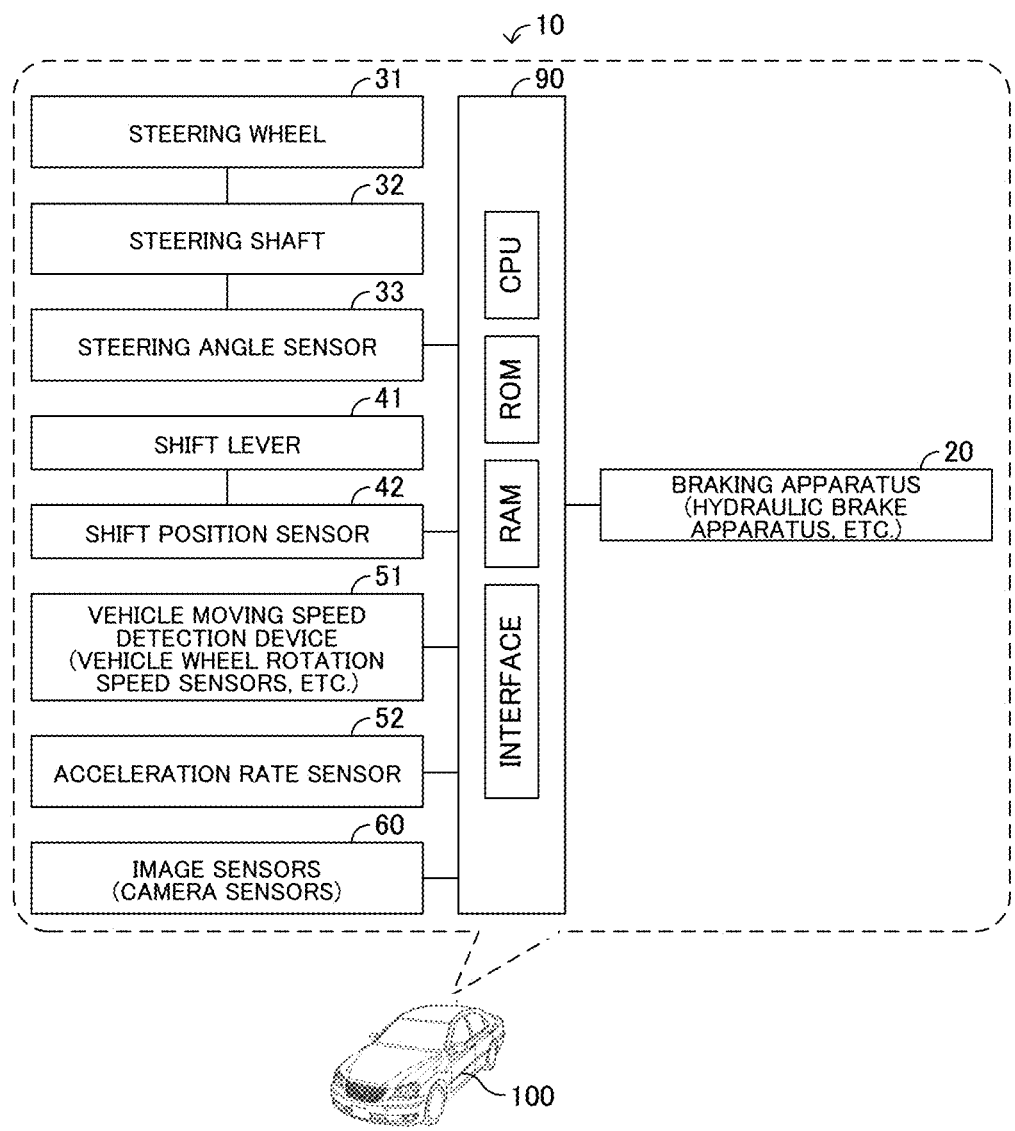
FIG. 1 is a view which shows a vehicle control apparatus including a collision damage reduction apparatus according to an embodiment of the present invention.

Below, a vehicle control apparatus including a collision damage reduction apparatus according to an embodiment of the present invention will be described with reference to the drawings. In the present embodiment, the vehicle control apparatus 10 according to the embodiment of the present disclosure is mounted on an own vehicle 100 as shown in FIG. 1. Hereinafter, the vehicle control apparatus 10 will be described with an example that an operator of the own vehicle 100 is a person who is in the own vehicle 100 and drives the own vehicle 100, that is, a driver of the own vehicle 100.

However, the operator of the own vehicle 100 may be a remote operator of the own vehicle 100, i.e., an operator who is not in the own vehicle 100 but remotely drives the own vehicle 100. When the operator of the own vehicle 100 is the remote operator, the vehicle control apparatuses 10 are mounted on the own vehicle 100 and a remote operation facility installed outside the own vehicle 100 for remotely driving the own vehicle 100. In this case, functions of the vehicle control apparatus 10 described below are realized by the vehicle control apparatus 10 mounted on the own vehicle 100 and the vehicle control apparatus 10 mounted on the remote operation facility.

As shown in FIG. 1, the vehicle control apparatus 10 includes an ECU 90 as a control device. The ECU 90 is an electronic control unit. The ECU 90 includes a microcomputer as a main component. The microcomputer includes a CPU, a ROM, a RAM, a non-volatile memory, and an interface. The CPU implements various functions by executing instructions, programs, or routines stored in the ROM. In the present embodiment, the vehicle control apparatus 10 includes one ECU, but as will be described later, the vehicle control apparatus 10 may include a plurality of the ECUs and execute various processes described later by the ECUs.

Next, operations of the vehicle control apparatus 10 will be described. The operations of the vehicle control apparatus 10 in a scene that the own vehicle 100 moves rearward will be described below. In this regard, the present invention can be applied to a scene that the own vehicle 100 moves forward.

Figure 2:
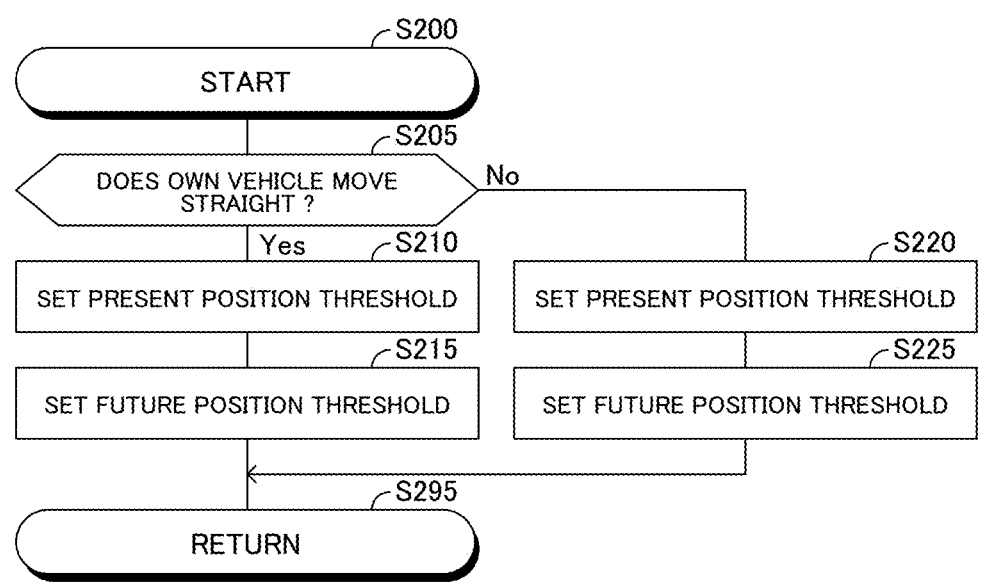
FIG. 2 is a view which shows a routine executed by the vehicle control apparatus according to the embodiment of the present invention.

The vehicle control apparatus 10 executes a routine shown in FIG. 2 at a predetermined calculation cycle. Therefore, at a predetermined timing, the vehicle control apparatus 10 starts a process from a step S200 of the routine shown in FIG. 2, and proceeds with the process to a step S205 to determine whether the own vehicle 100 moves rearward straight or turns rearward, based on a shift position of the own vehicle 100 and the steering angle θ.

As shown in FIG. 1, the own vehicle 100 is installed with a shift lever 41 and a shift position sensor 42. The shift position sensor 42 is a sensor which detects a shift position or a setting position of the shift lever 41. The shift position sensor 42 is electrically connected to the ECU 90. The vehicle control apparatus 10 detects the shift position of the shift lever 41 by the shift position sensor 42 and determines whether the own vehicle 100 moves forward or rearward, based on the detected shift position.

Further, a steering wheel 31, a steering shaft 32, and a steering angle sensor 33 are installed on the own vehicle 100. The steering wheel 31 is connected to the steering shaft 32. The steering angle sensor 33 is a sensor which detects a rotation angle of the steering shaft 32 with respect to its neutral position. The steering angle sensor 33 is electrically connected to the ECU 90. The vehicle control apparatus 10 acquires the rotation angle of the steering shaft 32 as a steering angle θ by the steering angle sensor 33. The vehicle control apparatus 10 determines whether the own vehicle 100 moves straight or turns, based on the steering angle θ.

When the vehicle control apparatus 10 determines "Yes" at the step S205, the vehicle control apparatus 10 proceeds with the process to a step S210 to set a present position threshold Pp_th.

Figure 4A:
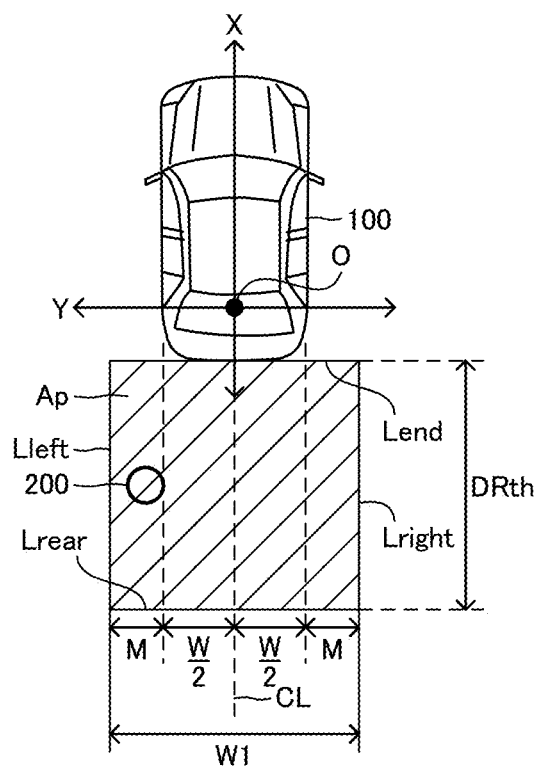
FIG. 4A is a view which shows a present position determination area when an own vehicle moves rearward and straight.

The present position threshold Pp_th set when the own vehicle 100 moves rearward and straight includes (i) a left present position threshold Pp_left_th and (ii) a right present position threshold Pp_right_th. As shown in FIG. 4A, when the own vehicle 100 moves rearward and straight, the left present position threshold Pp_left_th is a value which defines a line Lleft which extends in a longitudinal direction of the own vehicle 100 along a center line CL of the own vehicle 100 on the left of the center line CL. Further, when the own vehicle 100 moves rearward and straight, the right present position threshold Pp_right_th is a value which defines a line Lright which extends in the longitudinal direction of the own vehicle 100 along the center line CL of the own vehicle 100 on the right of the center line CL. In the present embodiment, the left present position threshold Pp_left_th is set to a value which defines the line Lleft extending on the left of a left wall surface of the own vehicle 100. Further, the right present position threshold Pp_right_th is set to a value which defines the line Lright extending on the right of a right wall surface of the own vehicle 100.

As shown in FIG. 4A, the present position threshold Pp_th is a value which defines a present position determination area Ap, i.e., a predetermined area forward in a moving direction of the own vehicle 100. The present position determination area Ap (a first area) is an area used to determine that the own vehicle 100 collides with an object 200 when the object 200 such as a person exists in the present position determination area Ap. The present position determination area Ap is an area surrounded by (i) the line Lleft defined by the left present position threshold Pp_left_th, (ii) the line Lright defined by the right present position threshold Pp_right_th, (iii) an own vehicle rear end line Lend, and (iv) an own vehicle rearward line Lrear. The present position determination area Ap is an area which has a predetermined width or a first width W1. It should be noted that the own vehicle rear end line Lend is a line which extends horizontally along a rear end of the own vehicle 100 in a width direction of the own vehicle 100, and the own vehicle rearward line Lrear is a line which extends horizontally in the width direction of the own vehicle 100 at a position spaced a predetermined distance or a predetermined rearward distance DRth from the own vehicle 100 in the longitudinal direction of the own vehicle 100.

In the present embodiment, the present position threshold Pp_th is defined by coordinates in an X-Y coordinate system with respect to the own vehicle 100. The X-Y coordinate system is a coordinate system which has (i) an origin O corresponding to an intersection of a rear wheel shaft of the own vehicle 100 and the center line CL of the own vehicle 100, (ii) an X-axis corresponding to a line extending horizontally in the width direction or a lateral direction of the own vehicle 100, and (iii) a Y-axis corresponding to a line extending horizontally in the longitudinal direction of the own vehicle 100. In the present embodiment, the X-Y coordinate system is a coordinate system in which a side forward from the origin O on the own vehicle 100 on the X-axis, is positive, and a side leftward from the origin O on the own vehicle 100 on the Y-axis, is positive.

That is, the vehicle control apparatus 10 acquires a present Y-coordinate threshold Yp_th as the left present position threshold Pp_left_th and the right present position threshold Pp_right_th by a calculation according to a formula 1 below. In the formula 1 below, "W" is the width of the own vehicle 100, and "M" is a preset determination margin.

$$Yp\_th = (W/2) + M \quad (1)$$

Next, the vehicle control apparatus 10 proceeds with the process to a step S215 to set a future position threshold Pf_th. Then, the vehicle control apparatus 10 proceeds with the process to a step S295 to terminate executing this routine once.

Figure 4B:
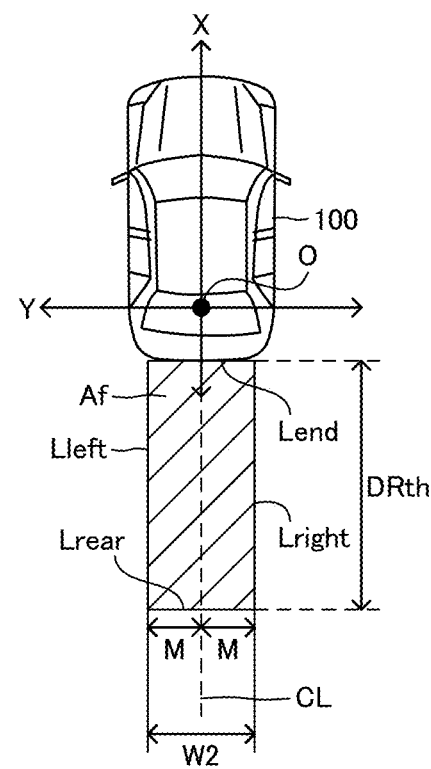
FIG. 4B is a view which a future position determination area when the own vehicle moves rearward and straight.

The future position threshold Pf_th set when the own vehicle 100 moves rearward and straight includes (i) a left future position threshold Pf_left_th and (ii) a right future position threshold Pf_right_th. As shown in FIG. 4B, the left future position threshold Pf_left_th is a value which defines the line Lleft extending in the longitudinal direction of the own vehicle 100 along the center line CL of the own vehicle 100 on the left of the center line CL. Further, the right future position threshold Pf_right_th is a value which defines the line Lright extending in the longitudinal direction of the own vehicle 100 along the center line CL of the own vehicle 100 on the right of the center line CL. In the present embodiment, the left future position threshold Pf_left_th is set to a value which defines the line Lleft extending between the center line CL of the own vehicle 100 and the left wall surface of the own vehicle 100. Further, the right future position threshold Pf_right_th is set to a value which defines the line Lright extending between the center line CL of the own vehicle 100 and the right wall surface of the own vehicle 100.

Further, as shown in FIG. 4B, the future position threshold Pf_th is a value which defines a future position determination area Af, i.e., a predetermined area forward in the moving direction of the own vehicle 100. The future position determination area Af (or a second area) is an area used to determine that the own vehicle 100 collides with the object 200 when the object 200 predictively exists in the future position determination area Af after a predetermined period of time Δt. The future position determination area Af is an area surrounded by (i) the line Lleft defined by the left future position threshold Pf_left_th, (ii) the line Lright defined by the right future position threshold Pf_right_th, (iii) the own vehicle rear end line Lend, and (iv) the own vehicle rearward line Lrear. Further, the future position determination area Af is an area which has a predetermined width or a second width W2 smaller than the width or the first width W1 of the present position determination area Ap.

In the present embodiment, the future position threshold Pf_th is also defined by the coordinates in the X-Y coordinate system with respect to the own vehicle 100. That is, the vehicle control apparatus 10 sets a future Y-coordinate threshold Yf_th as the left future position threshold Pf_left_th and the right future position threshold Pf_right_th by the calculation according to a formula 2 below.

$$Yf\_th = M \quad (2)$$

On the other hand, when the vehicle control apparatus 10 determines "No" at the step S205, the vehicle control apparatus 10 proceeds with the process to a step S220 to set the present position threshold Pp_th.

The present position threshold Pp_th set when the own vehicle 100 turns rearward includes (i) an inner present position threshold Pp_in_th and (ii) an outer present position threshold Pp_out_th. As shown in FIG. 5A, the inner present position threshold Pp_in_th is a value which defines an arc-shaped line Lin having (i) a center corresponding to a turning center TC of the own vehicle 100 and (ii) a radius shorter than a distance from the turning center TC to the center line CL of the own vehicle 100. Further, the outer present position threshold Pp_out_th is a value which defines an arc-shaped line Lout having (i) a center corresponding to the turning center TC of the own vehicle 100 and (ii) a radius longer than the distance from the turning center TC to the center line CL of the own vehicle 100. In the present embodiment, the inner present position threshold Pp_in_th is set to a value which defines the arc-shaped line Lin crossing a line extending horizontally from the turning center TC toward the own vehicle 100 in the width direction of the own vehicle 100 at a point on the side of the turning center TC with respect to a wall surface of the own vehicle 100 on the side of the turning center TC. Further, the outer present position threshold Pp_out_th is set to a value which defines the arc-shaped line Lout crossing the line extending horizontally from the turning center TC toward the own vehicle 100 in the width direction of the own vehicle 100 at a point away from the turning center TC with respect to a wall surface of the own vehicle 100 away from the turning center TC.

Further, as shown in FIG. 5A, the present position threshold Pp_th is a value which defines a predetermined area or the present position determination area Ap. The present position determination area Ap is an area used to determine that the own vehicle 100 collides with the object 200 when the object 200 exists in the present position determination area Ap. The present position determination area Ap is an area surrounded by (i) the arc-shaped line Lin defined by the inner present position threshold Pp_in_th, (ii) the arc-shaped line Lout defined by the outer present position threshold Pp_out_th, (iii) the own vehicle rear end line Lend, and (iv) the own vehicle rearward line Lrear. It should be noted that, as described above, the own vehicle rear end line Lend is a line which extends horizontally along the rear end of the own vehicle 100 in the width direction of the own vehicle 100. Further, the own vehicle rearward line Lrear is a line which extends horizontally so as to be perpendicular to (i) the arc-shaped line Lin defined by the inner present position threshold Pp_in_th and (ii) the arc-shaped line Lout defined by the outer present position threshold Pp_out_th at a point separated rearward from the own vehicle 100 by a predetermined distance or the predetermined rearward distance DRth along a turning direction of the own vehicle 100.

The vehicle control apparatus 10 sets the inner present distance threshold Dp_in_th as the inner present position threshold Pp_in_th by the calculation according to a formula 3 below, and sets the outer present distance threshold Dp_out_th as the outer present position threshold Pp_out_th by the calculation according to a formula 4 below. In the formula 3 and the formula 4, "Ytc" is the Y-coordinate of the turning center TC as shown in FIG. 5.

$$Dp\_in\_th = Ytc - W/2 - M \quad (3)$$

$$Dp\_out\_th = Ytc + W/2 + M \quad (4)$$

Next, the vehicle control apparatus 10 proceeds with the process to a step S225 to set the future position threshold Pf_th. Then, the vehicle control apparatus 10 proceeds with the process to the step S295 to terminate executing this routine once.

The future position threshold Pf_th set when the own vehicle 100 turns rearward includes (i) an inner future position threshold Pf_in_th and (ii) an outer future position threshold Pf_out_th. As shown in FIG. 5B, the inner future position threshold Pf_in_th is a value which defines the arc-shaped line Lin having (i) a center corresponding to the turning center TC of the own vehicle and (ii) a radius corresponding to a distance shorter than the distance from the turning center TC to the center line CL of the own vehicle 100, and the outer future position threshold Pf_out_th is a value which defines the arc-shaped line Lout having (i) a center corresponding to the turning center TC of the own vehicle 100 and (ii) a radium corresponding to a distance longer than the distance from the turning center TC to the center line CL of the own vehicle 100. In this example, the inner future position threshold Pf_in_th is set to a value which defines the arc-shaped line Lin crossing the line extending horizontally from the turning center TC toward the own vehicle 100 in the width direction of the own vehicle 100 at a point away from the turning center TC with respect to the wall surface of the own vehicle on the side of the turning center TC. Further, the outer future position threshold Pf_out_th is set to a value which defines the arc-shaped line Lout crossing the line extending horizontally from the turning center TC toward the own vehicle 100 in the width direction of the own vehicle 100 on the side of the wall surface of the own vehicle away from the turning center TC.

Further, as shown in FIG. 5B, the future position threshold Pf_th is a value which defines a predetermined area or the future position determination area Af. The future position determination area Af is an area used to determine that the own vehicle 100 collides with the object 200 when the object 200 exists in the future position determination area Af. The future position determination area Af is an area surrounded by (i) the arc-shaped line Lin defined by the inner future position threshold Pf_in_th, (ii) the arc-shaped line Lout defined by the outer future position threshold Pf_out_th, (iii) the own vehicle rear end line Lend, and (iv) the own vehicle rearward line Lrear. It should be noted that, as described above, the own vehicle rear end line Lend is a line which extends horizontally along the rear end of the own vehicle 100 in the widthwise direction of the own vehicle 100. Further, the own vehicle rearward line Lrear is a line which extends horizontally so as to be perpendicular to (i) the arc-shaped line Lin defined by the inner future position threshold Pf_in_th and (ii) the arc-shaped line Lout defined by the outer future position threshold Pf_out_th at a point rearward away from the own vehicle 100 along the turning direction of the own vehicle 100 by a predetermined distance or the predetermined rearward distance DRth.

The vehicle control apparatus 10 sets the inner future distance threshold Df_in_th as the inner future position threshold Pf_in_th by the calculation according to a formula 5 below, and sets the outer future distance threshold Df_out_th as the outer future position threshold Pf_out_th by the calculation according to a formula 6 below.

$$Df\_in\_th = Ytc - M \quad (5)$$

$$Df\_out\_th = Ytc + M \quad (6)$$

Figure 3:
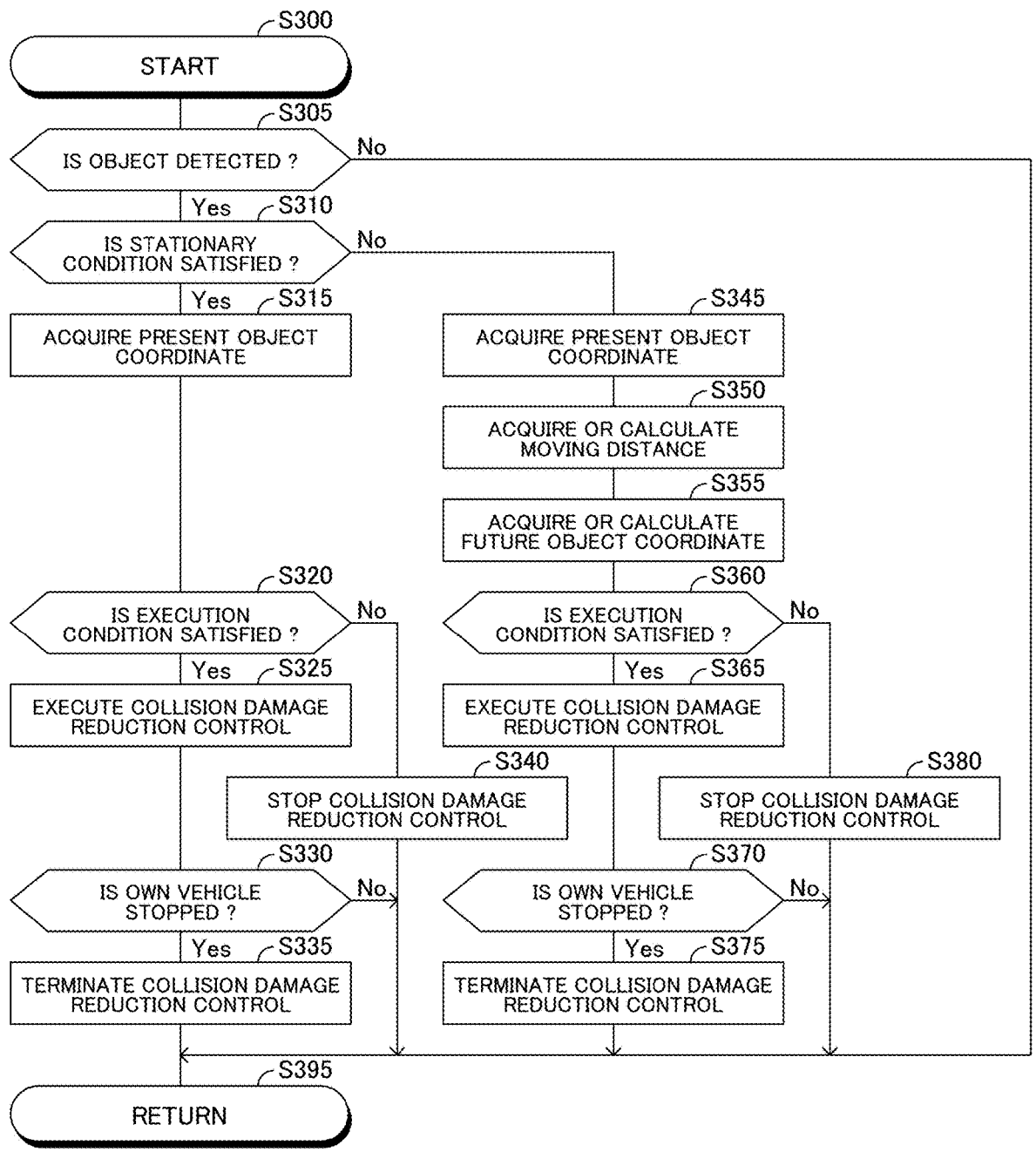
FIG. 3 is a view which shows a routine executed by the vehicle control apparatus according to the embodiment of the present invention.

Further, the vehicle control apparatus 10 executes a routine shown in FIG. 3 at the predetermined calculation cycle. Therefore, at a predetermined timing, the vehicle control apparatus 10 starts a process from a step S300 of the routine shown in FIG. 3 and proceeds with the process to a step S305 to determine whether the object 200 is detected, based on image information IC.

As shown in FIG. 1, the own vehicle 100 is installed with image sensors 60. The image sensor 60 is a sensor which captures images of views around the own vehicle 100 and acquires image data. The image sensor 60 is, for example, a camera sensor. The image sensors 60 are electrically connected to the ECU 90. The vehicle control apparatus 10 acquires the image data from the image sensors 60.

When the vehicle control apparatus 10 determines "Yes" at the step S305, the vehicle control apparatus 10 proceeds with the process to a step S310 to determines whether a stationary condition Cs is satisfied for the detected object 200.

The stationary condition Cs is a condition that the number of times of determination N is equal to or greater than a predetermined number of times Nth (N≥Nth). The number of times of determination N is the number that an object speed index value I is consecutively determined to be greater than a predetermined object speed index value Ith (I>Ith). The object speed index value I is a value correlated with an object speed Vobj, i.e., a moving speed of the object 200. In the present embodiment, the object speed index value I is a square of the object speed Vobj ($I=Vobj^2$). In this regard, when the object speed index value I is determined to be equal to or smaller than the predetermined object speed index value Ith prior to the number of times of determination N becoming equal to or greater than the predetermined number of times Nth, the number of times of determination N is cleared or reset. Further, the vehicle control apparatus 10 acquires the object speed Vobj, based on the image information IC.

When the vehicle control apparatus 10 determines "Yes" at the step S310, the vehicle control apparatus 10 proceeds with the process to a step S315 to acquire a present object X-coordinate Xp and a present object Y-coordinate Yp as a present object coordinate XYp or a present object position.

The present object X-coordinate Xp and the present object Y-coordinate Yp are the X-coordinate and the Y-coordinate of a position where the object 200 currently exists, respectively. In this embodiment, the vehicle control apparatus 10 acquires the present object X-coordinate Xp and the present object Y-coordinate Yp, based on the image information IC by appropriately considering a vehicle moving speed Vego, a longitudinal acceleration rate Gx, and a lateral acceleration rate Gy.

As shown in FIG. 1, the own vehicle 100 is installed with a vehicle moving speed detection device 51. The vehicle moving speed detection device 51 is a device which detects a moving speed of the own vehicle 100. The vehicle moving speed detection device 51 includes, for example, wheel rotation speed sensors provided on respective wheels of the own vehicle 100. The vehicle moving speed detection device 51 is electrically connected to the ECU 90. The vehicle control apparatus 10 acquires the moving speed of the own vehicle 100 as the own vehicle moving speed Vego by the vehicle moving speed detection device 51.

The own vehicle 100 is also installed with an acceleration rate sensor 52. The acceleration rate sensor 52 is a sensor which detects an acceleration rate in the longitudinal direction or a front-rear direction of the own vehicle 100 and an acceleration rate in the lateral direction or the width direction of the own vehicle 100. The acceleration rate sensor 52 is electrically connected to the ECU 90. The vehicle control apparatus 10 acquires the longitudinal acceleration rate of the own vehicle 100 as the longitudinal acceleration rate Gx by the acceleration rate sensor 52, and acquires the lateral acceleration of the own vehicle 100 as the lateral acceleration rate Gy by the acceleration rate sensor 52.

Next, the vehicle control apparatus 10 proceeds with the process to a step S320 to determine whether an execution condition Cexe is satisfied, based on the present object coordinate XYp acquired at the step S315.

The execution condition Cexe becomes satisfied when any one of a first area condition Ca_1 and a second area condition Ca_2 described below becomes satisfied.

The first area condition Ca_1 is a condition that (i) a rearward distance DR is equal to or smaller than the predetermined rearward distance DRth (DR DRth), and (ii) an absolute value of the present object Y-coordinate Yp is equal to or smaller than a present Y-coordinate threshold Yp_th (|Yp|≤Yp_th) when the own vehicle 100 moves rearward and straight. That is, the first area condition Ca_1 is a condition that the object 200 exists in the present position determination area Ap when the own vehicle 100 moves rearward and straight. It should be noted that the rearward distance DR is a distance between the own vehicle rear end line Lend and a line extending horizontally in the width direction of the own vehicle 100 through the object 200 when the object 200 exists rearward from the own vehicle 100 with respect to the own vehicle rear end line Lend, i.e., the line extending horizontally in the width direction of the own vehicle 100 along the rear end of the own vehicle 100.

The second area condition Ca_2 is a condition that (i) the rearward distance DR is equal to or smaller than the predetermined rearward distance DRth (DR DRth), and (ii) a present object distance Dp is equal to or greater than an inner present distance threshold Dp_in_th and equal to or smaller than an outer present distance threshold Dp_out_th (Dp_in_th≤Dp≤Dp_out_th) when the own vehicle 100 turns rearward. That is, the second area condition Ca_2 is a condition that the object 200 exists in the present position determination area Ap when the own vehicle 100 turns rearward. It should be noted that the present object distance Dp is a distance from the present position of the object 200 to the turning center TC of the own vehicle 100. The vehicle control apparatus 10 acquires the X-Y coordinate of the position of the turning center TC in the X-Y coordinate system, based on the image information IC and acquires the present object distance Dp from the acquired X-Y coordinate of the position of the turning center TC, and the present object coordinate XYp.

Thereby, for example, when (i) the object 200 is stationary, and (ii) this stationary object 200 exists in the present position determination area Ap as shown in FIG. 4A or FIG. 5A, the execution condition Cexe is satisfied.

When the vehicle control apparatus 10 determines "Yes" at the step S320, the vehicle control apparatus 10 proceeds with the process to a step S325 to execute a collision damage reduction control.

The collision damage reduction control is one of automatic driving controls. The collision damage reduction control is a control for reducing damage caused by a collision of the own vehicle 100 with the object 200. As the collision damage reduction control, there are (i) a control to alert the driver of the own vehicle 100 when the own vehicle 100 is determined to collide with the object 200 and (ii) a control to autonomously steering the own vehicle 100 such that the own vehicle 100 passes, avoiding the object 200 when the own vehicle 100 is determined to collide with the object 200. In the present embodiment, the collision damage reduction control is an autonomous braking control to stop the own vehicle 100 before the object 200 by autonomously applying a braking force to the own vehicle 100 when the own vehicle 100 is determined to collide with the object 200.

As shown in FIG. 1, a braking apparatus 20 is installed on the own vehicle 100. The braking apparatus 20 is an apparatus which applies the braking force to the own vehicle 100, and is, for example, a hydraulic brake apparatus. The braking apparatus 20 is electrically connected to the ECU 90. The vehicle control apparatus 10 controls the braking force applied to the own vehicle 100 by the braking apparatus 20.

Next, the vehicle control apparatus 10 proceeds with the process to a step S330 to determine whether the own vehicle 100 is stopped. When the vehicle moving speed Vego is zero, the vehicle control apparatus 10 determines that the own vehicle 100 has been stopped.

When the vehicle control apparatus 10 determines "Yes" at the step S330, the vehicle control apparatus 10 proceeds with the process to a step S335 to terminate executing the collision damage reduction control. Then, the vehicle control apparatus 10 proceeds with the process to a step S395 to terminate executing this routine once.

On the other hand, when the vehicle control apparatus 10 determines "No" at the step S330, the vehicle control apparatus 10 proceeds with the process directly to the step S395 to terminate executing this routine once.

Further, when the vehicle control apparatus 10 determines "No" at the step S320, the vehicle control apparatus 10 proceeds with the process to a step S340 to stop executing the collision damage reduction control when the collision damage reduction control is being executed. Then, the vehicle control apparatus 10 proceeds the process to the step S395 to terminate executing this routine once. On the other hand, when (i) the vehicle control apparatus proceeds with the process to the step S340, and (ii) the collision damage reduction control is not executed, the vehicle control apparatus 10 proceeds with the process to the step S395 to terminate executing this routine once without executing the collision damage reduction control.

Further, when the vehicle control apparatus 10 determines "No" at the step S310, the vehicle control apparatus 10 proceeds with the process to a step S345 to acquire the present object X-coordinate Xp and the present object Y-coordinate Yp as the present object coordinate XYp.

Next, the vehicle control apparatus 10 proceeds with the process to a step S350 to acquire a moving distance Dm (i.e., an X-axis direction moving distance Dm_x and a Y-axis direction moving distance Dm_y).

In this example, the X-axis direction moving distance Dm_x and the Y-axis direction moving distance Dm_y are distances that the object 200 predictively moves in the X-axis direction and the Y-axis direction during a predetermined period of time Δt, respectively. The vehicle control apparatus 10 acquires the X-axis direction moving distance Dm_x by the calculation according to a formula 7 below, and acquires the Y-axis direction moving distance Dm_y by the calculation according to a formula 8 below. In the formula 7, "Vobj_x" is an X component of the object speed Vobj, and in the formula 8, "Vobj_y" is a Y component of the object speed Vobj.

$$Dm\_x = Vobj\_x * \Delta t \quad (7)$$

$$Dm\_y = Vobj\_y * \Delta t \quad (8)$$

In this regard, the vehicle control apparatus 10 may be configured to acquire the moving distance Dm, i.e., a distance that the object 200 predictively moves during the predetermined period of time Δt by the calculation according to a formula 9 below, and limit the moving distance Dm to a distance equal to or smaller than an upper limit distance Dm_limit when the acquired moving distance Dm is greater than the upper limit distance Dm_limit. In this case, the vehicle control apparatus 10 acquires a corrected X-axis direction moving distance Dm_x_c by correcting the X-axis direction moving distance Dm_x by the calculation according to a formula 10 below, acquires a corrected Y-axis direction moving distance Dm_y_c by correcting the Y-axis direction moving distance Dm_y by the calculation according to a formula 11 below, and acquires the acquired corrected X-axis direction moving distance Dm_x_c and the acquired corrected Y-axis direction moving distance Dm_y_c as the X-axis direction moving distance Dm_x and the Y-axis direction moving distance Dm_y, respectively.

$$Dm = \sqrt{(Dm\_x^2 + Dm\_y^2)} \quad (9)$$

$$Dm\_x\_c = Dm\_x * Dm\_\text{limit}/Dm \quad (10)$$

$$Dm\_y\_c = Dm\_y * Dm\_\text{limit}/Dm \quad (11)$$

Next, the vehicle control apparatus 10 proceeds with the process to a step S355 to acquire a future object X coordinate Xf and a future object Y coordinate Yf as the future object coordinate XYf or a future object position.

The future object X coordinate Xf and the future object Y coordinate Yf are the X-coordinate and the Y-coordinate of the position where the object 200 exists after the predetermined period of time Δt, respectively. In this embodiment, the vehicle control apparatus 10 acquires the future object X coordinate Xf by the calculation according to a formula 12 below, and acquires the future object Y coordinate Yf by the calculation according to a formula 13 below.

$$Xf = Xp + Dm\_x \quad (12)$$

$$Yf = Yp + Dm\_y \quad (13)$$

Next, the vehicle control apparatus 10 proceeds with the process to a step S360 to determine whether an execution condition Cexe is satisfied.

The execution condition Cexe becomes satisfied when any one of the first area condition Ca_1 and the second area condition Ca_2 described above and a third area condition Ca_3 to a fifth area condition Ca_5 described below becomes satisfied.

The third area condition Ca_3 is a condition that (i) the rearward distance DR is equal to or smaller than the predetermined rearward distance DRth (DR DRth), (ii) the absolute value of the present object Y-coordinate Yp is greater than the present Y-coordinate threshold Yp_th (|Yp|>Yp_th), and (iii) the absolute value of the future object Y coordinate Yf is equal to or smaller than the future Y coordinate threshold Yf_th (|Yf|Yf_th) when the own vehicle 100 moves rearward and straight. That is, the third area condition Ca_3 is a condition that the object 200 does not exist in the present position determination area Ap, but the object 200 predictively exists in the future position determination area Af after the predetermined period of time Δt when the own vehicle 100 moves rearward and straight.

The fourth area condition Ca_4 is a condition that (i) the rearward distance DR is equal to or smaller than the predetermined rearward distance DRth (DR DRth), (ii) the present object distance Dp is greater than the outer present distance threshold Dp_out_th (Dp>Dp_out_th), and (iii) a future object distance Df is equal to or greater than the inner future distance threshold Df_in_th and equal to or smaller than the outer future distance threshold Df_out_th (Df_in_th≤Df≤Df_out_th) when the own vehicle 100 turns rearward. That is, the fourth area condition Ca_4 is a condition that the object 200 does not exist in the present position determination area Ap, but the object 200 predictively exists in the future position determination area Af after the predetermined period Δt when the own vehicle 100 turns rearward. It should be noted that the future object distance Df is a distance from the position of the object 200 after the predetermined period of time Δt to the turning center TC of the own vehicle 100. The vehicle control apparatus 10 acquires the future object distance Df from the X-Y coordinate of the position of the turning center TC in the X-Y coordinate system and the future object coordinate XYf.

The fifth area condition Ca_5 is a condition that (i) the rearward distance DR is equal to or smaller than the predetermined rearward distance DRth (DR DRth), (ii) the present object distance Dp is smaller than the inner present distance threshold Dp_in_th (Dp<Dp_in_th), and (iii) the future object distance Df is equal to or greater than the inner future distance threshold Df_in_th and equal to or smaller than the outer future distance threshold Df_out_th (Df_in_th≤Df≤Df_out_th) when the own vehicle 100 turns rearward. That is, the fifth area condition Ca_5 is a condition that the object 200 does not exist in the present position determination area Ap, but the object 200 predictively exists in the future position determination area Af after the predetermined period of time Δt when the own vehicle 100 turns rearward.

Thereby, for example, when the object 200 is moving and exists in the present position determination area Ap as shown in FIG. 4A or FIG. 5A, the execution condition Cexe is satisfied.

Figure 4C:
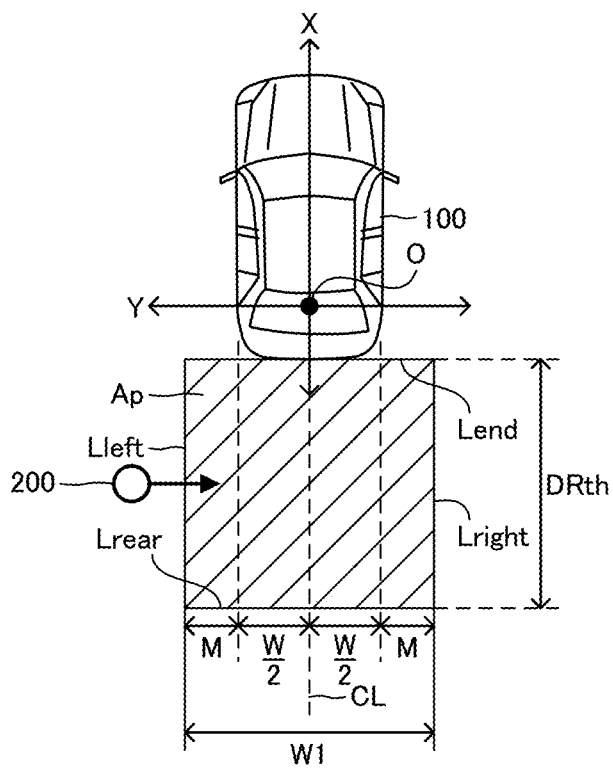
FIG. 4C is a view which shows a scene that an object does not exist in the present position determination area when the own vehicle moves rearward and straight.
Figure 4D:
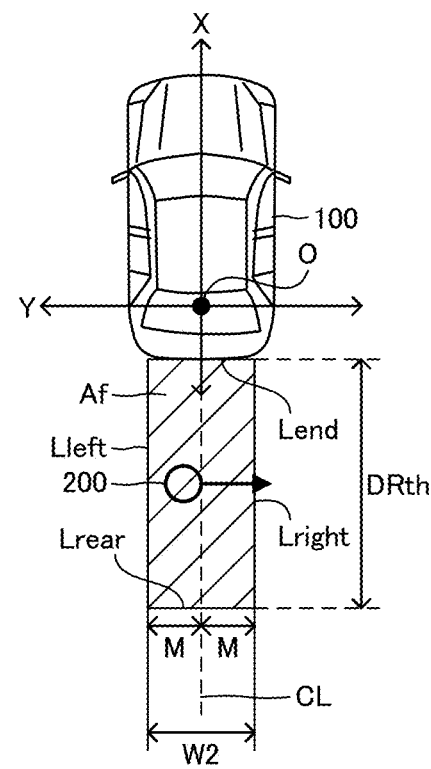
FIG. 4D is a view which shows a scene that the object predictively exists in the future position determination area when the own vehicle moves rearward and straight.

When (i) the object 200 is moving, but the moving object 200 does not exists in the present position determination area Ap as shown in FIG. 4C, and (ii) the object 200 exists in the future position determination area Af after the predetermined period of time Δt as shown in FIG. 4D, the execution condition Cexe is satisfied.

Similarly, when (i) the object 200 is moving, but the moving object 200 does not exist in the present position determination area Ap as shown in FIG. 5C, and (ii) the object 200 exists in the future position determination area Af after the predetermined period of time Δt as shown in FIG. 5D, the execution condition Cexe is also satisfied.

It should be noted that the vehicle control apparatus 10 may be configured to (i) determine that the execution condition Cexe becomes satisfied when an entry condition Cin becomes satisfied, (ii) determine that the execution condition Cexe is satisfied after the entry condition Cin becomes satisfied until an exit condition Cout becomes satisfied, and (iii) determine that the execution condition Cexe is not satisfied when the exit condition Cout becomes satisfied.

In this case, the entry condition Cin becomes satisfied when any one of a first entry condition Cin_1 to a fifth entry conditions Cin_5 below becomes satisfied.

The first entry condition Cin_1 is a condition that the first area condition Ca_1 becomes satisfied when (i) the own vehicle 100 moves rearward and straight, and (ii) the execution condition Cexe is not satisfied. That is, the first entry condition Cin_1 is a condition that the object 200 enters the present position determination area Ap when (i) the own vehicle 100 moves rearward and straight, and (ii) the execution condition Cexe is not satisfied.

The second entry condition Cin_2 is a condition that the second area condition Ca_2 becomes satisfied when (i) the own vehicle 100 turns rearward, and (ii) the execution condition Cexe is not satisfied. That is, the second entry condition Cin_2 is a condition that the object 200 enters the present position determination area Ap when (i) the own vehicle 100 turns rearward, and (ii) the execution condition Cexe is not satisfied.

The third entry condition Cin_3 is a condition that the third area condition Ca_3 becomes satisfied when (i) the own vehicle 100 moves rearward and straight, and (ii) the execution condition Cexe is not satisfied. That is, the third entry condition Cin_3 is a condition that the object 200 does not enter the present position determination area Ap, but the object 200 predictively enters the future position determination area Af after the predetermined period of time Δt when (i) the own vehicle 100 moves rearward and straight, and (ii) the execution condition Cexe is not satisfied.

The fourth entry condition Cin_4 is a condition that the fourth area condition Ca_4 becomes satisfied when (i) the own vehicle 100 turns rearward, and (ii) the execution condition Cexe is not satisfied. That is, the fourth entry condition Cin_4 is a condition that the object 200 does not enter the present position determination area Ap, but the object 200 predictively enters the future position determination area Af after the predetermined period of time Δt when (i) the own vehicle 100 turns rearward, and (ii) the execution condition Cexe is not satisfied.

The fifth entry condition Cin_5 is a condition that the fifth area condition Ca_5 becomes satisfied when (i) the own vehicle 100 turns rearward, and (ii) the execution condition Cexe is not satisfied. That is, the fifth entry condition Cin_5 is a condition that the object 200 does not enter the present position determination area Ap, but the object 200 predictively enters the future position determination area Af after the predetermined period of time Δt when (i) the own vehicle 100 turns rearward, and (ii) the execution condition Cexe is not satisfied.

On the other hand, the exit condition Cout is a condition that becomes satisfied when any one of a first exit condition Cout_1 to a third exit condition Cout_3 becomes satisfied.

The first exit condition Cout_1 is a condition that (i) the rearward distance DR becomes greater than the predetermined rearward distance DRth (DR>DRth) after the execution condition Cexe becomes satisfied when (i) the own vehicle 100 moves rearward and straight, or (ii) the rearward distance DR is equal to or smaller than the predetermined rearward distance DRth, but the absolute value of the present object Y-coordinate Yp is greater than the present Y-coordinate threshold Yp_th, and the absolute value of the future object Y coordinate Yf is greater than the future Y coordinate threshold Yf_th (|Yp_th|>Yp and |Yg|>Yf_th) after the execution condition Cexe becomes satisfied when the own vehicle 100 moves rearward and straight. That is, the first exit condition Cout_1 is a condition that the object 200 does not exist in the present position determination area Ap, and the object 200 predictively does not exist in the future position determination area Af after the predetermined period of time Δt after the execution condition Cexe becomes satisfied when the own vehicle 100 moves rearward and straight.

The second exit condition Cout_2 is a condition that (i) the rearward distance DR becomes greater than the predetermined rearward distance DRth (DR>DRth) after the execution condition Cexe becomes satisfied when the own vehicle 100 turns rearward, or (ii) the present object distance Dp is smaller than the inner present distance threshold Dp_in_th, and the future object distance Df is smaller than the inner future distance threshold Df_in_th (Dp<Dp_in_th and Df<Df_in_th) after the execution condition Cexe becomes satisfied when the own vehicle 100 turns rearward. That is, the second exit condition Cout_2 is a condition that the object 200 does not exist in the present position determination area Ap, the object 200 predictively does not exist in the future position determination area Af after the predetermined period of time Δt after the execution condition Cexe becomes satisfied when the own vehicle 100 turns rearward.

The third exit condition Cout_3 is a condition that (i) the rearward distance DR becomes greater than the predetermined rearward distance DRth (DR>DRth) after the execution condition Cexe becomes satisfied when the own vehicle 100 turns rearward, or (ii) the present object distance Dp is greater than the outer present distance threshold Dp_out_th, and the future object distance Df is greater than the outer future distance threshold Df_out_th (Dp>Dp_out_th and Df>Df_out_th) after the execution condition Cexe becomes satisfied when the own vehicle 100 turns rearward. That is, the third exit condition Cout_3 is a condition that the object 200 does not exist in the present position determination area Ap, and the object 200 predictively does not exist in the future position determination area Af after the predetermined period of time Δt after the execution condition Cexe becomes satisfied when the own vehicle 100 turns rearward.

Further, the vehicle control apparatus 10 may be configured to determine that the execution condition Cexe is not satisfied, independently of whether the object 200 exists in the future position determination area Af after the predetermined period of time Δt, and not execute the collision damage reduction control when (i) the object speed Vobj is greater than a predetermined speed, and (ii) the object 200 does not exist in the present position determination area Ap.

When the vehicle control apparatus 10 determines "Yes" at the step S360, the vehicle control apparatus 10 proceeds with the process to a step S365 to execute the collision damage reduction control. Then, the vehicle control apparatus 10 proceeds with the process to a step S370 to determine whether the own vehicle 100 is stopped.

When the vehicle control apparatus 10 determines "Yes" at the step S370, the vehicle control apparatus 10 proceeds with the process to a step S375 to stop executing the collision damage reduction control. Then, the vehicle control apparatus 10 proceeds with the process to a step S395 to terminate executing this routine once.

On the other hand, when the vehicle control apparatus 10 determines "No" at the step S370, the vehicle control apparatus 10 proceeds with the process directly to the step S395 to terminate executing this routine once.

Further, when the vehicle control apparatus 10 determines "No" at the step S360, the vehicle control apparatus 10 proceeds with the process to a step S380 to stop executing the collision damage reduction control when the collision damage reduction control is being executed. Then, the vehicle control apparatus 10 proceeds with the process to the step S395 to terminate executing this routine once. On the other hand, when the vehicle control apparatus 10 proceeds with the process to the step S380, and the collision damage reduction control is not executed, the vehicle control apparatus 10 proceeds with the process to the step S395 to terminate executing this routine once without executing the collision damage reduction control.

Further, when the vehicle control apparatus 10 determines "No" at the step S305, the vehicle control apparatus 10 proceeds with the process directly to the step S395 to terminate executing this routine once.

<Advantages>

If the present position determination area Ap, i.e., an area used for determining whether to execute the collision damage reduction control, based on the present position of the object 200 is used for determining whether to execute the collision damage reduction control, based on the prediction result of predicting the position of the object 200 in the future, the collision damage reduction control may be unnecessarily executed due to a low accuracy of the prediction result.

With the vehicle control apparatus 10, the future position determination area Af, i.e., an area which is narrower than the present position determination area Ap, i.e., an area used for determining whether to execute the collision damage reduction control, based on the present object position, i.e., the present position of the object 200, is used for determining whether to execute the collision damage reduction control, based on the predicted result of predicting the future object position, i.e., the position of the object 200 in the future. Therefore, the collision damage reduction control can be prevented from being unnecessarily executed.

It should be noted that the present invention is not limited to the above-described embodiments, and various modifications can be adopted within the scope of the present invention.

For example, the vehicle control apparatus 10 may be configured to not determine that the execution condition Cexe becomes satisfied even when any one of the third area condition Ca_3 to the fifth area condition Ca_5 described above becomes satisfied when the object 200 exists at a position relatively distant from a rear arear of the own vehicle 100 in the width direction of the own vehicle 100. In other words, the vehicle control apparatus 10 may be configured to not determine that the execution condition Cexe becomes satisfied and not execute the collision damage reduction control even when any one of the third area condition Ca_3 to the fifth area condition Ca_5 becomes satisfied when the absolute value of the present object Y-coordinate Yp is greater than or equal to a relatively great predetermined value.

Further, in the above-described example, the determination margin M is set to the same value in all cases in which the present Y-coordinate threshold Yp_th, the future Y coordinate threshold Yf_th, the inner present distance threshold Dp_in_th, the outer present distance threshold Dp_out_th, the inner future distance threshold Df_in_th, and the outer future distance threshold Df_out_th are respectively acquired, but may be set to different values in each case.

What is claimed is:

1. A collision damage reduction apparatus, comprising:
an electronic control unit configured to execute a collision damage reduction control to reduce damage due to a collision of an own vehicle with an object,
wherein the electronic control unit is configured to:
execute the collision damage reduction control when the object exists in a first area,
the first area being an area in a moving direction of the own vehicle and having a first width set, based on a width of the own vehicle; and
execute the collision damage reduction control when the object does not exist in the first area, but the object predictively exists in a second area after a predetermined period of time,
the second area being an area in the moving direction of the own vehicle and having a width smaller than the first width, and
the electronic control unit is configured to not execute the collision damage reduction control, independently of whether the object exists in the second area after the predetermined period of time when (i) a detected moving speed of the object is greater than a predetermined speed, and (ii) the object does not exist in the first area.

2. The collision damage reduction apparatus as claimed in claim 1,
wherein the electronic control unit is configured to:
predict whether the object exists in the second area after the predetermined period of time, based on a moving distance which the object predictively moves for the predetermined period of time; and
predict whether the object exists in the second area after the predetermined period of time, limiting the moving distance to a distance equal to or smaller than an upper limit distance when the moving distance is greater than the upper limit distance.

* * * * *